United States Patent
Choi

(10) Patent No.: US 9,584,849 B2
(45) Date of Patent: Feb. 28, 2017

(54) TOUCH USER INTERFACE METHOD AND IMAGING APPARATUS

(71) Applicant: Kyung Soon Choi, Seoul (KR)

(72) Inventor: Kyung Soon Choi, Seoul (KR)

( * ) Notice: Subject to any disclaimer, the term of this patent is extended or adjusted under 35 U.S.C. 154(b) by 0 days.

(21) Appl. No.: 14/905,561

(22) PCT Filed: Jul. 17, 2013

(86) PCT No.: PCT/KR2013/006405
§ 371 (c)(1),
(2) Date: Jan. 15, 2016

(87) PCT Pub. No.: WO2014/014278
PCT Pub. Date: Jan. 23, 2014

(65) Prior Publication Data
US 2016/0150265 A1   May 26, 2016

(51) Int. Cl.
*H04N 21/422* (2011.01)
*G06F 3/0488* (2013.01)
*G06F 3/0482* (2013.01)
*H04N 21/433* (2011.01)
(Continued)

(52) U.S. Cl.
CPC ..... *H04N 21/42224* (2013.01); *G06F 3/0482* (2013.01); *G06F 3/04883* (2013.01); *H04N 21/4334* (2013.01); *H04N 21/485* (2013.01); *H04N 21/4828* (2013.01)

(58) Field of Classification Search
None
See application file for complete search history.

(56) References Cited

U.S. PATENT DOCUMENTS

| 6,765,557 B1 | 7/2004 | Segal et al. |
| 8,054,294 B2 | 11/2011 | Sakai et al. |
| 8,384,672 B2 | 2/2013 | Sakai et al. |

(Continued)

FOREIGN PATENT DOCUMENTS

| KR | 10-0720335 B1 | 5/2007 |
| KR | 10-2007-0095119 A | 9/2007 |

(Continued)

OTHER PUBLICATIONS

International Search Report PCT/ISA/210 for International Application No. PCT/KR2013/006405 Dated Oct. 11, 2013.

*Primary Examiner* — Nicholas Corbo
(74) *Attorney, Agent, or Firm* — Harness, Dickey & Pierce, P.L.C.

(57) ABSTRACT

The present invention relates to a touch user interface of an imaging apparatus such as a smart TV. The present invention relates to a user interface method and to an imaging apparatus, in which various menus required for implementing functions provided by the imaging apparatus such as a remote controller command, content, application, web and a TV channel are structured to be fit to two or more menu search modes and correspond respectively to two or more independent touch regions, so that the whole process, from a menu and search mode selection to a final menu item selection, can be carried out by a single touch movement without viewing a remote controller, and the independent touch regions and dependent touch regions are divided to allow for efficient use of the input sensor of the remote controller, having a narrow touch surface.

9 Claims, 7 Drawing Sheets

(51) Int. Cl.
*H04N 21/482* (2011.01)
*H04N 21/485* (2011.01)

(56) References Cited

U.S. PATENT DOCUMENTS

| | | | |
|---|---|---|---|
| 2007/0106945 A1* | 5/2007 | Kim | G06F 3/03547 |
| | | | 715/740 |
| 2007/0229465 A1 | 10/2007 | Sakai et al. | |
| 2011/0111795 A1* | 5/2011 | Hong | H04N 5/44543 |
| | | | 455/556.1 |
| 2012/0044061 A1 | 2/2012 | Sakai et al. | |
| 2012/0113001 A1 | 5/2012 | Yamauchi et al. | |

FOREIGN PATENT DOCUMENTS

| | | |
|---|---|---|
| KR | 10-0942821 B1 | 2/2010 |
| KR | 10-2010-0069200 A | 6/2010 |
| KR | 10-1101945 B1 | 1/2012 |
| KR | 10-2012-0014020 A | 2/2012 |

\* cited by examiner

TOUCH USER INTERFACE METHOD AND IMAGING APPARATUS

TECHNICAL FIELD

The present invention relates to an imaging apparatus and a touch user interface method for searching and controlling various functions of the imaging apparatus.

BACKGROUND ART

With the wide use of smart TV and PC TV, TV is able to process various functions such as VOD, app, games, SNS, banking, shopping, and information search as well as the functions of conventional channel TV or IPTV. In order to select and control these various function, remote controllers with at least 50 buttons having multiple functions are usually used. It is hard to be well-acquainted with the functions of buttons different among remote controllers and there are more than a few occasions requiring at least 30 times of button pressing when a large scale of VOD content is search, so that these remote controllers have lost their original purposes of allowing users to easily and quickly use a wanted function with a single gesture.

Many user interfaces for controlling a cursor displayed on an imaging apparatus using a remote controller equipped with a motion sensor, an optical track pad (OTP), or a touch pad have been introduced. User interface controlling a cursor includes complicate stages of 1) displaying a home menu on a screen; 2) selecting a menu item by moving a cursor; 3) changing a sub menu page multiple times; and 4) selecting a sub menu item multiple times. This type of interface frustrates users who want to select a function with a gesture or two so that the users eventually give up on using many functions provided in an imaging apparatus.

In case where a plurality of menu icons are provided on a sensor touch surface of a remote controller and a menu item is selected by selecting the menu icon and performing touch movement, when a user searches for a menu item by doing touch movement several times, it is hard for the user to select the icon without seeing the remote controller and there is no touch space enough to apply second and third touch movement in order to extend a search procedure since most of the area of the touch surface is divided for and occupied by the menu icons.

A method of neutrally using a part of a touch area is disclosed in Korean Patent Publication No. 10-2012-0014020 (of Apple Inc.) in which a gesture is analyzed into a different command according to context. This method relates to user interface for analyzing touch input data received from an unstructuralized touch input area based on the current context of GUI to determine a command from a group of potential commands. According to this method, multiple gestures are required since a single gesture executes a single command and one gesture is analyzed into different commands according to context.

A method of selecting a remote controller command according to a touch movement is disclosed in Korean Patent No. 10-1101945. This patent whose inventor is the same as the present invention relates to user interface for generating a one-time command and a repetitive command according to an initial touch region and an initial touch movement direction and for setting touch regions corresponding to commands to overlap each other on a touch surface of a remote controller so that the size of an effective touch region changes, thereby realizing efficient use. According to the method, a unique command or menu mode cannot be set in an overlapping area and at least one more gesture is required to distinctively select either a beginning stage or a proceeding stage of a menu search.

A method of inputting text corresponding to a relative coordinate generated according to a touch movement vector is disclosed in Korean Patent No. 10-0720335. The patent whose inventor is the same as the present invention relates to user interface for selecting a menu item at one level (usually a two-dimensional lattice structure) such as several tens of TV channels or a keypad using a single touch movement.

A method and apparatus for inputting a command or data according to the distance and direction change of a touch movement is disclosed in Korean Patent No. 10-0942821. The patent whose inventor is the same as the present invention relates to user interface for selecting a menu item at one level based on the distance of touch movement from a reference point and seamlessly moving to a lower level through the direction change of the touch movement, thereby allowing a large scale of menu structured in several levels to be searched using a single or minimum touch movement. This method allows at least 100 to several million menu items to be searched using a single circular or zigzag touch movement.

DETAILED DESCRIPTION OF THE INVENTION

Technical Goal of the Invention

The present invention provides a method of 1) performing a process from a menu and search mode selection to a final menu item selection with a single or minimum touch movement without watching a remote controller, 2) navigating a menu selecting process in an imaging apparatus to facilitate using, and 3) simplifying a remote controller as much as possible to unify remote controllers different among imaging apparatuses; a method of 4) separately selecting a search start stage and a proceeding stage for each menu and 5) efficiently and spaciously using a narrow touch surface of a touch input device; and a user interface method of 6) readily updating a menu which changes frequently.

Technical Solutions of the Invention

In order to achieve the goal of the present invention, various menus are matched to appropriate search modes according to the size and characteristics of the menus in an imaging apparatus and a touch region corresponding to a menu search mode is set in the main body of the image apparatus to flexibly respond to various functions provided by the imaging apparatus. An independent touch region corresponding to a menu search mode is set at a corner of a virtual touch surface to allow a user to select the menu search mode and to search or control a menu item using a touch movement without watching a remote controller. At least one dependent touch region is set in a wide area at the center of the virtual touch surface, so that when a user comfortably touches the dependent touch region and makes a touch movement while the menu search mode corresponding to the independent touch region is going on, the menu search mode corresponding to the independent touch region continues; and when the user touches the dependent touch region and makes a touch movement while the menu search mode corresponding to the independent touch region is not going on, a unique menu search mode or command set to correspond to the dependent touch region is executed.

According to an aspect of the present invention, there is provided a user interface method of an imaging apparatus, which includes setting at least two menu search modes; setting at least two independent touch regions and at least one dependent touch region; recognizing an initial touch region; selecting a menu search mode corresponding to an initially-touched independent touch region or to the direction of an initial touch movement continuing from the initially-touched independent touch region and making a shift to an item in the selected menu search mode according to touch movement information continuing without a touch release; extending a state and method of an ongoing independent touch region menu search mode when receiving touch movement information continuing from an initial touch made on a dependent touch region after a touch release is performed in the ongoing independent touch region menu search mode; and executing a menu search mode or command uniquely set for the dependent touch region when receiving touch movement information continuing from an initial touch made on the dependent touch region while there is no ongoing independent touch region menu search mode.

According to another aspect of the present invention, there is provided an imaging apparatus which includes a main body including a CPU, a program, a memory storing the program, and a communication interface means and a remote touch input device. The imaging apparatus includes a means for setting at least two menu search modes; a means for setting at least two independent touch regions and at least one dependent touch region; a means for recognizing an initial touch position, a touch movement, and a touch release; a means for recognizing an initial touch region; a means for determining a touch movement direction when a touch position moves a predetermined distance or across a predetermined border; a means for selecting a menu search mode corresponding to an initially-touched independent touch region or to the direction of an initial touch movement continuing from the initially-touched independent touch region and making a shift to an item in the selected menu search mode according to information about the touch movement continuing without a touch release; a means for extending a state and method of an ongoing independent touch region menu search mode when a touch is released during the independent touch region menu search mode and then an initial touch is made on a dependent touch region and moved; and a means for executing a menu search mode or command uniquely set for a dependent touch region when an initial touch is made on the dependent touch region and moved in a state where there is no ongoing independent touch region menu search mode.

Effect of the Invention

According to the present invention, a user of a touch remote controller is allowed to immediately select a wanted menu search mode by touching an independent touch region at a corner of a touch surface and making a touch movement in a predetermined direction without watching the remote controller and is allowed to select a menu item from among several to several million menu items classified according to menu search modes with a single straight or zigzag touch movement while watching the menu navigated on a screen. A search can also be performed using multiple touch movements for careful menu selection. A dependent touch region set in a wide center area is used as a temporary region for an ongoing menu search mode, so that the narrow touch surface of the remote controller can be efficiently used when a large-scale menu is searched and it is possible to immediately return to an initial state of an ongoing menu search mode or to immediately execute another menu search mode or command. Since touch regions are set in the main body of the imaging apparatus, a menu search mode, a touch region, or a command can be variably set according to the applications of the imaging apparatus, so that changeable menus or added functions can be easily dealt with.

BEST MODE FOR CARRYING OUT THE INVENTION

Figure 1:
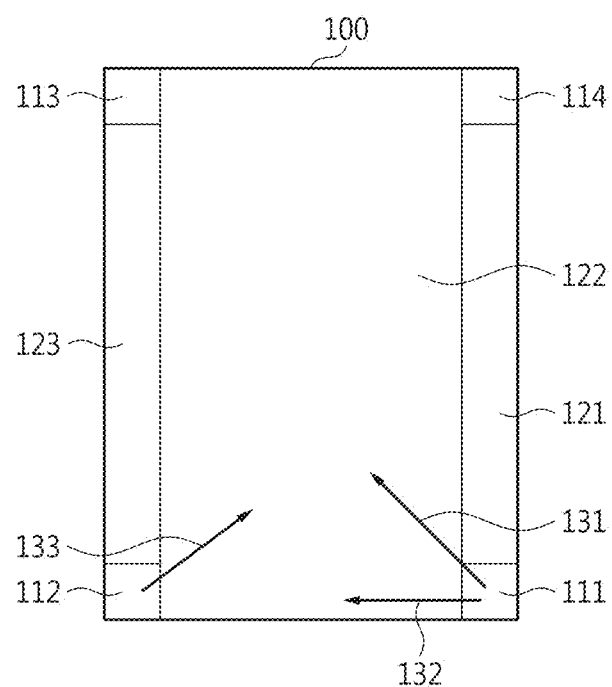
FIG. 1 is a diagram of touch regions set on a virtual touch surface according to some embodiments of the present invention.

FIG. 1 is a diagram of touch regions set on a virtual touch surface according to some embodiments of the present invention. In some embodiments, a virtual touch surface 100 corresponding to a touch surface input sensor of a remote controller is set in an imaging apparatus. Independent touch regions 111 through 114 are set at respective four corners of the virtual touch surface. Three dependent touch regions 121 through 123 are set at the center and the right and left sides of the touch surface to separate the independent touch regions from one another. At least one (e.g., one through three) menu search mode is set in each of the independent touch regions. When an independent touch region is initially touched and then a touch movement is performed, a menu search mode is selected according to an initial touch region and/or the direction of the initial touch movement and a part or whole of the selected menu is displayed on a screen.

In an embodiment of the present invention, when the independent touch region 111 at the bottom right corner in FIG. 1 is touched and a touch movement is performed in a diagonal direction 131, a remote controller command menu is selected so that menu items, i.e., remote controller commands are displayed in a matrix form in a display window on a screen. When the bottom-right independent touch region 111 is initially touched and a touch movement is made in a left direction 132, a content command menu is selected so that content commands are displayed in a row at a predetermined position on the screen.

In an embodiment of dependent touch regions, when the left dependent touch region 123 at the left edge in FIG. 1 is initially touched and a touch movement is performed up and down, a channel up/down command is repeatedly executed according to the distance of the touch movement. When the right dependent touch region 121 is initially touched and a touch movement is performed up and down, a volume up/down command is repeatedly executed according to the distance of the touch movement. When the central dependent touch region 122 is initially touched and a touch movement is performed upward, a favorite channel search mode starts. When the central dependent touch region 122 is initially touched and a touch movement is performed from side to side, a channel down/up command is executed according to the direction of the touch movement.

When each of the dependent touch regions 121 through 123 is initially touched and subjected to a touch movement in a state where no independent touch region menu search mode is under way, a unique menu search mode or a unique directional command is executed. However, when a certain independent touch region menu search mode is in progress, the dependent touch regions are involved in the extension of the state and method of the ongoing independent touch region menu search mode and thus differentiated from the independent touch regions involved in an operation always starting in an initial state. The function of an independent touch region is configured so that when the independent touch region is touched in a state where multiple menu search modes have been set according to a touch region and/or an initial touch movement direction, each search mode returns to an initial state and a menu item is immediately selected by a single touch movement in the initial state. Especially, realization of user interface allowing a final menu item to be selected with a single gesture is very important because the user interface lacks practicality when it cannot allow channel selection, remote controller command, or letter input to be performed with a simple gesture. However, when a menu which is not often used is searched, when a large-scale menu is searched, or when a menu item is carefully selected; it is necessary to perform a search process in multiple stages with multiple gestures. At this time, the dependent touch regions enable a selected independent touch region to be extended, so that the search process is divided into multiple stages.

For a user interface method according to the present invention, touch regions may be set on the touch surface of a remote controller, the remote controller may determine an initial touch region and send initial touch region information to the main body of an imaging apparatus, and the imaging apparatus may recognize the initial touch region. However, it is preferable that a virtual touch surface and virtual touch regions are set in the main body of the imaging apparatus and the imaging apparatus recognizes the initial touch region based on initial touch position information received from the remote controller. When more part of user interface is processed in the main body of the imaging apparatus; the imaging apparatus can operate in association with any type of touch input devices, which provide information about initial touch position, touch movement, and touch release, without depending on a particular remote controller. Accordingly, a remote controller is simplified and remote controllers different among imaging apparatuses can be unified. In addition, the shape and position of the touch region and the Arabic numeral for the touch region can be flexibly adjusted according to the applications of the imaging apparatus, so that a necessary menu search mode or command can be easily linked.

Embodiments

Subjects in which the present invention is carried out include imaging apparatuses such as smart TV, over-the top (OTT), set-top box, PC, game machine, camera, cellular phone, CCTV, and TV function extension kit, which receive and process touch information from a remote touch input device and generate an image signal.

A touch input device includes a mobile device such as a remote controller, a PDA, a smart phone, or an internet phone, which is equipped with a touch surface input sensor to transmit at least initial touch position information, touch movement information, and touch release information according to a user's touch gesture. In this specification, the touch input device is referred to as a remote controller in order to clarify the description.

A user interface method according to the present invention is based on the premise that all items such as content, TV channel, remote controller command, content command, letter, text, URL, hypertext, hypermedia, app, and data which can be selected by a user in an imaging apparatus are formed into a menu to correspond to at least two menu search modes.

Hereinafter, preferred embodiments of the present invention will be described in detail with reference to the attached drawings. The content below describes the embodiments and the present invention is not restricted to these embodiments. Technical descriptions which have already been known in the field of the present invention or are not directly related with the present invention will be avoided so far as possible. It is because the gist of the present invention is more clearly delivered by omitting an unnecessary description. Redundant description will also be omitted and like reference numerals in the drawings denote like elements.

FIG. 1 is a diagram of touch regions set on a virtual touch surface according to some embodiments of the present invention. In some embodiments, a virtual touch surface 100 corresponding to a touch surface input sensor of a remote controller is set in an imaging apparatus. Independent touch regions 111 through 114 are set at respective four corners of the virtual touch surface. Three dependent touch regions 121 through 123 are set at the center and the right and left sides of the touch surface to separate the independent touch regions from one another. One through three menu search modes are set in each of the independent touch regions. When an independent touch region is initially touched and then a touch movement is performed, a menu search mode is selected according to an initial touch region and/or the direction of the initial touch movement and a part or whole of the selected menu is displayed on a screen for navigation.

An initial touch region is an area to which a touch start position belongs among at least two independent touch regions and at least one dependent touch regions which are predetermined in a remote controller or the main body of an imaging apparatus. An initial touch movement direction is recognized as one of horizontal, vertical and four diagonal directions when a position at which an initial touch is performed on a touch surface is regarded as a start point and a position reached when a touch moves a predetermined distance or passes a predetermined border is regarded as an end point. A sequential touch movement direction is recognized sequentially when an end point during the recognition of a previous touch movement direction is regarded as a start point and a position reached when the touch moves again the predetermined distance or passes a predetermined border is regarded as an end point. The touch region and the touch movement direction may be recognized by a remote controller, but it is more preferable that the main body of an imaging apparatus receives touch information from the remote controller and recognizes the touch region and the touch movement direction. When the imaging apparatus recognizes the touch region and the touch movement direction, the shape and use of the touch region and the Arabic numeral for the touch region can be readily changed to meet purposes using an app or a program downloaded from a server.

In an embodiment of the present invention, when the independent touch region 111 at the bottom right corner in FIG. 1 is touched and a touch movement is performed in a diagonal direction 131, a remote controller command menu is selected so that menu items, i.e., remote controller commands are displayed in a matrix form in a display window on a screen. When the bottom-right independent touch region 111 is initially touched and a touch movement is performed in a left direction 132, a content command menu is selected so that content commands are displayed in a row at a predetermined position on the screen.

Figure 2:
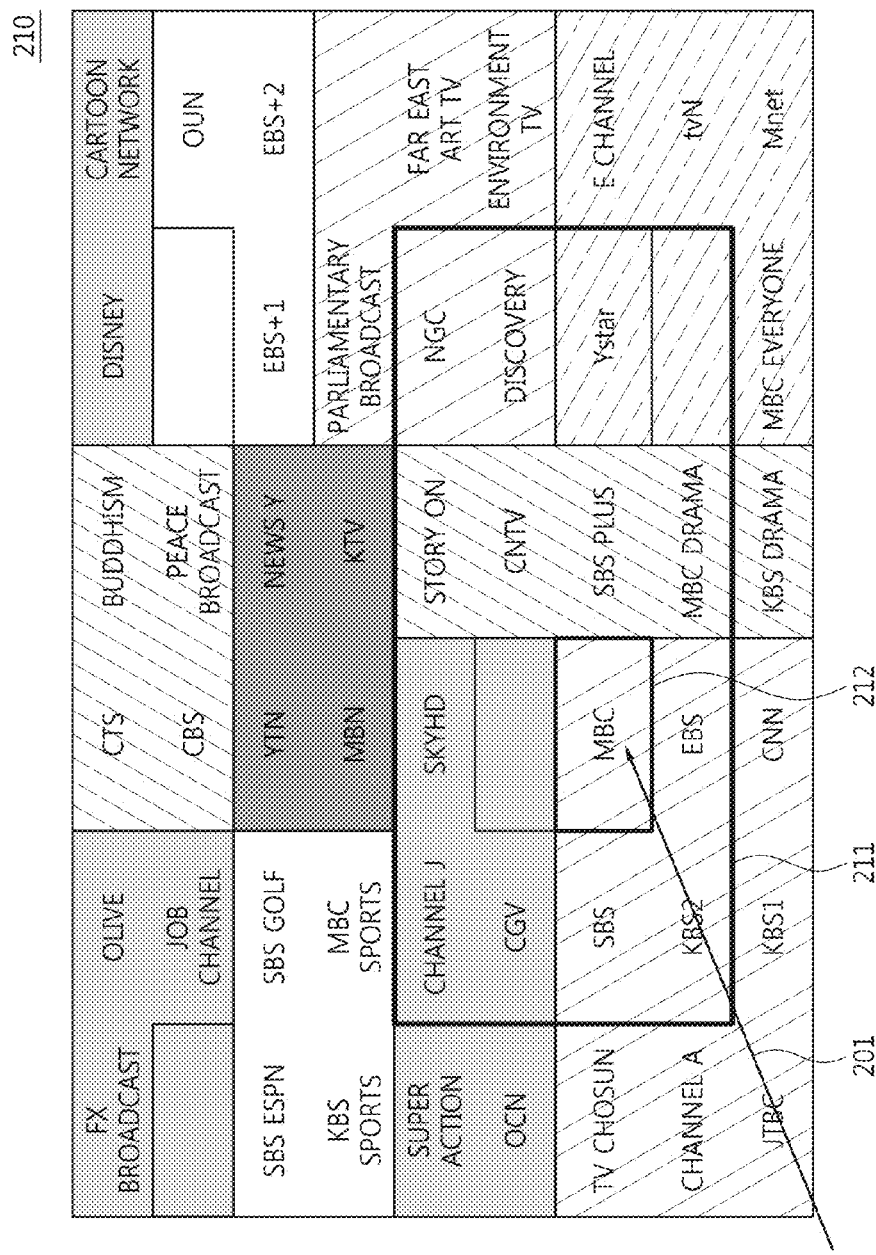
FIG. 2 is a diagram of a TV channel menu in a matrix form which is selected in a menu search mode according to some embodiments of the present invention.

When the independent touch region 112 at the bottom left corner in FIG. 1 is touched and a touch movement starts in a diagonal direction 133 or 201 shown in FIG. 2, a TV channel menu 210 formed in a matrix is selected and some of TV channel icons illustrated in FIG. 2 are displayed at a predetermined position on the screen in a 4×4 navigation matrix form 211 based on a touch movement vector. A TV channel 212 which pops up according to the touch movement vector sequentially shifts from "JTBC" to "KBS2" and "MBC". When the touch is released or a special input confirmation gesture such as tapping is made in a state where a certain channel is selected, the channel is tuned to by a TV tuner. When the bottom-left independent touch region 112 is touched and a touch movement is performed upward, a TV channel menu search mode is not selected but an electronic program guide (EPG) mode is selected and a part of an EPG channel menu is displayed upward in line. When the touch movement goes upward continuously, an EPG channel sequentially changes and an EPG programs-by-time menu is displayed on the right side of the display of the channel. When the touch movement turns to the right in a state where a certain channel is selected, a sequential shift is made on a menu listing programs of the channel by times.

In an embodiment of dependent touch regions, when the left dependent touch region 123 at the left edge in FIG. 1 is initially touched and a touch movement is performed up and down, a channel up/down command is repeatedly executed according to the distance of the touch movement. When the right dependent touch region 121 is initially touched and a touch movement is performed up and down, a volume up/down command is repeatedly executed according to the distance of the touch movement. When the central dependent touch region 122 is initially touched and a touch movement is performed upward, a favorite channel search mode starts. When the central dependent touch region 122 is initially touched and a touch movement is made from side to side, a channel down/up command is executed according to the direction of the touch movement.

Figure 3:
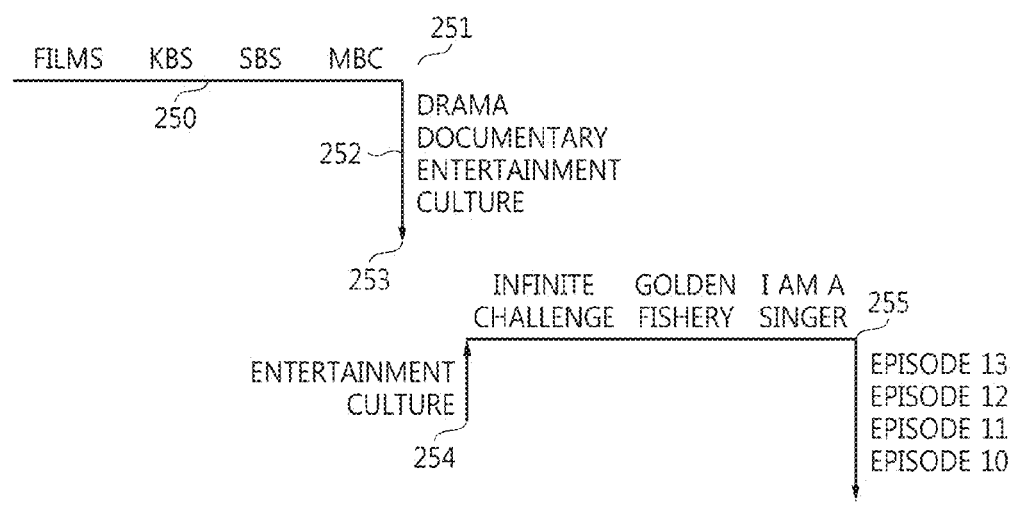
FIG. 3 is a diagram of a procedure for searching a menu in a hierarchical structure using a user interface method according to some embodiments of the present invention.

In the embodiments illustrated in FIG. 3, when the independent touch region 113 at the upper left corner in FIG. 1 is touched and a touch movement to the right starts (250), a VOD content menu search mode is selected so that a main menu, i.e., a broadcasting station menu listing "films", "KBS", "SBS", "MBC" and so on is displayed in line (251). When the touch movement turns downward (252) after the broadcasting station menu sequentially moves up to "MBC" with the rightward touch movement, genre sequentially shifts from drama to documentary, entertainment, and culture which the MBC provides. When the touch is released at the genre of culture positioned at the fourth place (253) and the central dependent touch region 122 is touched and an upward touch movement starts (254); the favorite channel search mode uniquely set for the central dependent touch region 122 does not start, but instead a shift of a menu item on the same level continues following the sequence of VOD content menu/MBC/culture that has proceeded. When the touch movement turns to the right after going back to the entertainment genre (255), a sequential shift is made from "program1 (e.g., Infinite Challenge)" to "program2 (e.g., Golden Fishery)" and "program3 (e.g., I am a Singer)" in a sub menu of the entertainment TV program genre that has been selected. When the touch movement turns downward at "program3 (I am a Singer)" and a tapping gesture or a special confirmation gesture is made right after a final menu item, e.g., the tenth episode of the "program3 (I am a Singer)" is reached; VOD content of the tenth episode of the "program3 (I am a Singer)", the finally selected TV program menu item, starts to be downloaded. At this time, when the touch movement continues without any touch release, a menu item shift continues according to an ongoing menu search mode whatever touch region a touch position passes. In other embodiments of the hierarchical menu search, instead of shifting a menu level every time a touch movement changes its direction, a shift to an upper-level menu or to a lower-level menu may be made by a touch movement from side to side and a menu item is shifted by an up/down touch movement at the selected menu level.

In the embodiments of a complex search mode, when the upper-right independent touch region 114 in FIG. 1 is touched and a touch movement to the left starts, a complex menu search mode is selected so that main menus such as "Myapp" and "Myphoto" are displayed in line. When the touch movement continues to the left until Myphoto is reached and the touch movement turns downward at Myphoto, preview photos are displayed as the menu items of Myphoto in a matrix form on the whole screen and a cursor appears. A photo can be selected when the cursor is moved to the photo using the continuous touch movement without any touch release or when the touch is released and then a certain dependent touch region is initially touched and a touch movement is made to move the cursor to the photo.

When a touch is released while a large-scale menu is being searched using a zigzag touch movement and then an ongoing menu search mode is selected again by initially touching an independent touch region for which the ongoing search mode has been set, the menu search mode newly starts from an initial state. In the embodiments illustrated in FIG. 1, when the touch is released in a state where the VOD content menu search mode, MBC, and the culture menu item have been selected (253) and then a touch movement is made to the right after the upper-left independent touch region 113 is initially touched; the VOD content menu search mode is newly selected and the main menu, i.e., the broadcasting station menu is displayed in line on the screen (251).

A process of determining a touch movement direction when touch information indicates a predetermined distance or a predetermined border may be performed in a remote controller or may be performed in the main body of an imaging apparatus which receives touch movement information from the remote controller. It is preferable using software (SW) in the main body of the imaging apparatus, so that the remote controller is simplified so far as possible and the touch movement direction is adaptively determined according to various operation modes of the imaging apparatus. Two, three, four, six, eight or sixteen directions are determined according to menu search modes and the distance or border of a touch movement referred to when the movement direction is determined is set differently or identically according to search modes.

In an embodiment of determining a touch movement direction, eight directions are defined. An imaging apparatus receives touch movement information and primarily recognizes a movement direction by regarding a position of an initial touch as a reference point and a position reached after the travel of a given distance as an end point and sequentially recognizes the movement direction when the given distance is travelled again from the previous end point regarded as a new reference point. A mode or command is selected from a menu search mode set for a touch region according to an initial movement direction. A menu item is shifted or the command is executed according to a subsequent movement direction.

For a user interface method according to the present invention, touch regions may be set on the touch surface of a remote controller, the remote controller may determine an initial touch region and send initial touch region information to the main body of an imaging apparatus, and the imaging apparatus may recognize the initial touch region. However, it is preferable that a virtual touch surface and virtual touch regions are set in the main body of the imaging apparatus and the imaging apparatus recognizes the initial touch region based on initial touch position information received from the remote controller. When more part of user interface is processed in the main body of the imaging apparatus; the imaging apparatus can operate in association with any type of touch input devices, which provide information about initial touch position, touch movement, and touch release, without depending on a particular remote controller. Accordingly, a remote controller is simplified and remote controllers different among imaging apparatuses can be unified. In addition, the shape and position of the touch region and the Arabic numeral for the touch region can be flexibly adjusted according to the applications of the imaging apparatus, so that a necessary menu search mode or command can be easily linked. Preferably, four independent touch regions respectively corresponding to four menu search modes and three dependent touch regions may be set on a virtual touch surface in an imaging apparatus. At this time, the independent touch regions are set in narrow areas at the corners 111 through 114 of the virtual touch surface, so that they are easily distinguished by a user and are not selected by mistake. The dependent touch regions frequently used for multiple purposes are set in wide areas at the center and edges (121 through 123) of the virtual touch surface to separate the independent touch regions from one another.

A menu search mode set for a touch region to search several to several million menu items according to the present invention is selected, according to the characteristics and size of a menu, from among 1) a mode in which a sequential shift is made from one to another among menu items arranged in one dimension according to a touch movement distance from a reference point, 2) a mode in which a shift is made to a menu item corresponding to a two-dimensional relative coordinate generated sequentially according to a touch movement from the reference point, 3) a mode in which a sequential shift is made from one to another among menu items set in a hierarchical structure according to the touch movement distance from the reference point and the directional change of the touch movement, 4) a mode in which a shift is made from one to another among the menu items displayed in at least one dimension or two by moving a cursor, and 5) a mode combining at least two of the above-described four modes. The present invention is not restricted to these five modes.

Menu items included in a menu search mode according to the present invention may be placed, as GUI elements indicating remote controller command, TV channel, content, app, URL, hypertext, hypermedia, and data or as a group of GUI elements, at fixed logical positions in a menu structure. However, menu items may be frequently added, deleted, or moved according to the applications of an imaging apparatus. Menu items may be frequently downloaded from a server system at an external internet site through a communication interface means to be updated and may be newly generated or deleted through a menu editing means for customization.

When each of the dependent touch regions 121 through 123 is initially touched and subjected to a touch movement in a state where no independent touch region menu search mode is under way, a unique menu search mode or a unique directional command is executed. However, when a certain independent touch region menu search mode is in progress, the dependent touch regions are involved in the extension of the state and method of the ongoing independent touch region menu search mode and thus differentiated from the independent touch regions involved in an operation always starting in an initial state. The function of an independent touch region is configured so that when the independent touch region is touched in a state where multiple menu search modes have been set according to a touch region and/or an initial touch movement direction, each search mode returns to an initial state and a menu item is immediately selected by a single touch movement in the initial state. Especially, realization of user interface allowing a final menu item to be selected with a single gesture is very important because the user interface lacks practicality when it cannot allow channel selection, remote controller command, or letter input to be performed with a simple gesture. However, when a menu which is not often used is searched, when a large-scale menu is searched, or when a menu item is carefully selected; it is necessary to perform a search process in multiple stages with multiple gestures. At this time, the dependent touch regions enable a selected independent touch region to be extended, so that the search process is divided into multiple stages.

Figure 4:
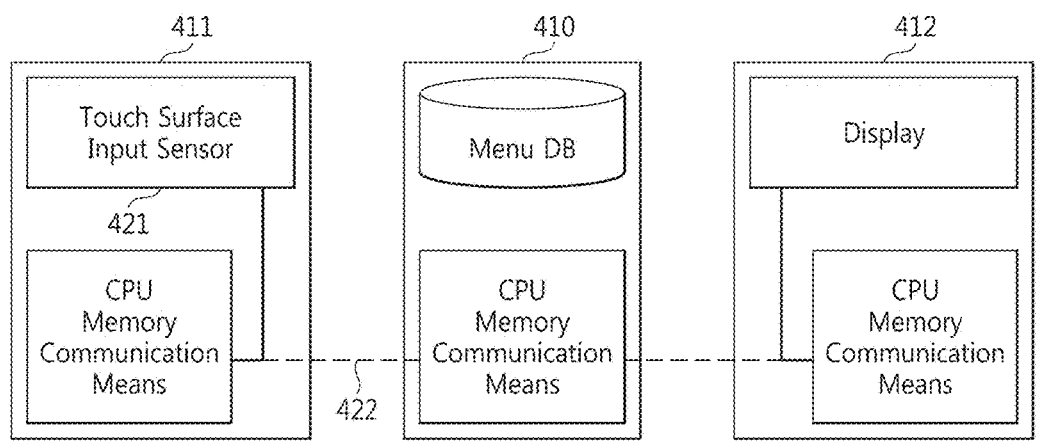
FIG. 4 is a block diagram of an imaging apparatus according to some embodiments of the present invention.

FIG. 4 is a block diagram of an imaging apparatus according to some embodiments of the present invention. The imaging apparatus includes a main body 410 and a remote controller 411 and displays an image signal through a display device 412 which integrates with the main body or is connected with the main body through a communication means. The main body 410, the remote controller 411, and the display device 412 connected through the communication means each includes a CPU, a memory, and a communication interface means. The main body implements a means for setting at least two menu search modes, a means for setting at least two independent touch regions and at least one dependent touch region, a means for recognizing an initial touch region, a means for determining a touch movement direction when a touch position moves a predetermined distance or a predetermined zone, a means for selecting a menu search mode corresponding to an initially-touched independent touch region or to the direction of an initial touch movement continuing from the initially-touched independent touch region and making a shift to an item in the selected menu search mode according to information about the touch movement continuing without a touch release, a means for extending the state and method of an ongoing independent touch region menu search mode when a touch is released during the independent touch region menu search mode and then an initial touch is made on a dependent touch region and moved, and a means for executing a menu search mode or command uniquely set for a dependent touch region when an initial touch is made on the dependent touch region and moved in a state where there is no ongoing independent touch region menu search mode, through the CPU using a computer program module stored in the memory. The CPU accesses a menu database (DB) stored in the memory according to the information received from the remote controller 411 and processes the program. A CPU included in the remote controller 411 processes a touch gesture for a touch surface input sensor 421 into an electrical input signal using a program stored in a memory, generates information about initial touch position, touch movement and touch release at least, and transmits the information to the main body using an IR or RF method (422). The remote controller used in the present invention may include any device which can detect touch position and movement information in a touch mode as well as a touch pad and a touch screen. Touch movement information transmitted from the remote controller may be expressed as pixel coordinate information or a vector based on the shift of a touch position. The main body 410 may include a display means such as LCD, PDP, or OLED to directly display an image like TV or may transmit a content image signal or an overlaid menu display signal to the separate display device 412, like a set-top box, a PC, a cellular phone, or a TV extension kit, in order to display image.

Figure 5:
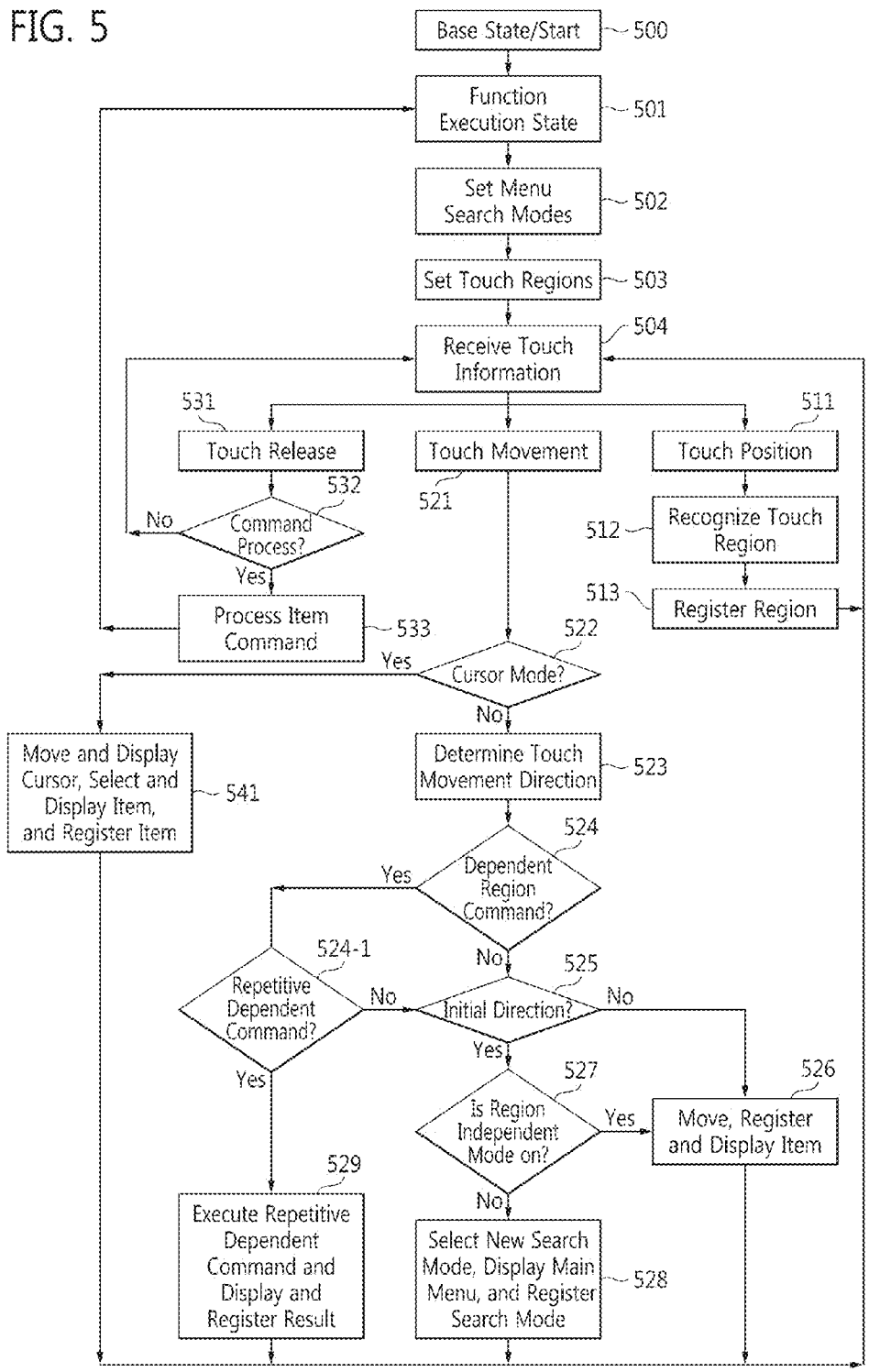
FIG. 5 is a flowchart of a user interface method of an imaging apparatus according to some embodiments of the present invention.

FIG. 5 is a flowchart of a user interface method of an imaging apparatus according to some embodiments of the present invention. The embodiments illustrated in FIG. 5 start from a base state when the imaging apparatus is powered on in operation 500. TV program channels are displayed in a default function execution state in operation 501 and menu search modes corresponding to TV program display states and touch regions corresponding to the menu search modes are set in operations 502 and 503. Although operation 503 is performed after operation 502 in FIG. 5, the order may be changed or operations 502 and 503 may be performed in parallel. The touch regions corresponding to the menu search modes may be set in advance in a program executed in the imaging apparatus.

Thereafter, the imaging apparatus enters a standby mode to receive touch information in operation 504. The touch information may include touch position information, touch movement information, and touch release information.

For instance, when the imaging apparatus receives the touch information while waiting for touch position information, touch movement information, and/or touch release information 531 as the touch information from a remote controller in operation 504, the imaging apparatus continues the user interface process of the present invention based on previous menu search mode, touch region, search mode progress, item selection state and so on recorded in a register. When receiving initial touch position information in operation 511, the imaging apparatus recognizes an initial touch region in operation 512 and records the initial touch region in the register in operation 513.

Thereafter, when receiving touch movement information in operation 521, the imaging apparatus selects an item by continuously moving a cursor on a screen in operation 541 in case where a search mode is a mode in which a menu is displayed and a selection is made by moving the cursor to the position of a menu item (i.e., in case of YES) in operation 522 and determines a touch movement direction every time a touch position moves a predetermined distance in operation 523 in case where the search mode is not the cursor search mode (i.e., in case of NO) in operation 522.

When a command is generated not by initially touching a dependent touch region but by initially touching an independent touch region (i.e., in case of NO) in operation 524, when an initial touch movement direction is determined (i.e., in case of YES) in operation 525, and when there is no ongoing independent touch region search mode (i.e., in case of NO) in operation 527; the imaging apparatus selects a menu search mode corresponding to the initial touch region registration information (in operation 513) and the initial touch movement direction information (in operation 523), displays a menu corresponding to the search mode at a predetermined position, and registers the menu search mode in operation 528 and returns to the standby mode to wait for new touch information in operation 504. When receiving subsequent touch movement information from the remote controller in operation 521, that is, according to a touch movement direction recognized in operation 525 after the menu search mode has been selected by the initial touch of the independent touch region and the initial touch movement direction, the imaging apparatus makes a shift to a menu item and displays and registers the menu item in operation 526.

When the touch is released in operation 531 after the menu item is selected and command process information is received in operation 532, the imaging apparatus processes an item selection command for the last selected menu item, e.g., ["KBS1" channel selection] or [VOD content "21st episode of Daejanggeum" selection], in operation 533 and returns to the item function execution state, e.g., channel connection or VOD content download state, in operation 501. In a state where the imaging apparatus does not receive command process information (i.e., in case of NO) in operation 532 after the menu item is selected and the touch is released in operation 531, when a dependent touch region is initially touched, that is, when the imaging apparatus receives touch position information of the dependent touch region as an initial touch position in operation 511, the imaging apparatus recognizes the touch region in operation 512, records the recognized touch region in the register in operation 513, and waits for next touch information in operation 504. When there is an ongoing independent touch region menu search mode (i.e., in case of YES) in operation 527, the imaging apparatus makes a shift to a menu item in the ongoing independent touch region menu search mode even though the touch movement information (in operation 521) following the initial touch of the dependent touch region indicates an initial movement direction in operation 525. When there is no ongoing independent touch region menu search mode (i.e., in case of NO) in operation 527, the imaging apparatus selects a new menu search mode, e.g., [customization TV channel menu], set for the dependent touch region in operation 528 and returns to the standby mode to receive subsequent touch movement information in operation 504. When receiving the subsequent touch movement information in operation 521, the imaging apparatus determines a touch movement direction in operation 523 and makes a shift to a menu item in the customization TV channel menu in operation 526 following the path of a dependent region command (YES in operation 524), a repetitive dependent command (NO in operation 524-1), and an initial direction (NO in operation 525).

When a dependent touch region, e.g., the right edge region 121 set to a volume up/down command in FIG. 1, is touched and the touch moves up and down in operation 524 in a state where there is no ongoing independent touch region menu search mode; the imaging apparatus recognizes the movement as a repetitive dependent command in operation 524-1, repeatedly executes the volume up/down command in response to the distance and direction of the touch movement, and displays a volume level corresponding to the result of executing the command on the screen in operation 529.

In a state where the imaging apparatus operates in the menu search mode in which a menu item displayed on the screen is selected by moving a cursor in operation 522 instead of selecting a menu item according to a touch movement direction sequentially recognized whenever a touch moves a predetermined distance, if the imaging apparatus receives touch movement information generated when a dependent touch region is initially touched and the touch is moved in operation 521 in a state where a menu has already been displayed, the imaging apparatus moves the cursor on the screen and selects, as a menu item, an icon or hypertext at a position where the cursor lands in operation 541. When a function, e.g., A bank membership registration, corresponding to the selected menu item is executed, commands such as volume up/down, channel up/down, and previous channel which are necessary during the display of a TV program are not necessary, but commands such as input letter, move cursor, and scroll are necessary. Accordingly, the imaging apparatus resets a virtual dependent touch region to a letter input mode or a cursor moving mode which is necessary for the execution of the item function, i.e., A bank membership registration in operations 502 and 503. At this time, the shape and number of touch regions corresponding to the letter input mode or the cursor moving mode may be changed.

The user interface method according to the embodiments of the present invention may be installed in the main body of the imaging apparatus in the form of a computer application program (or app) or middleware during manufacturing or may be downloaded from an external server system through a communication means and executed in the imaging apparatus.

Figure 6:
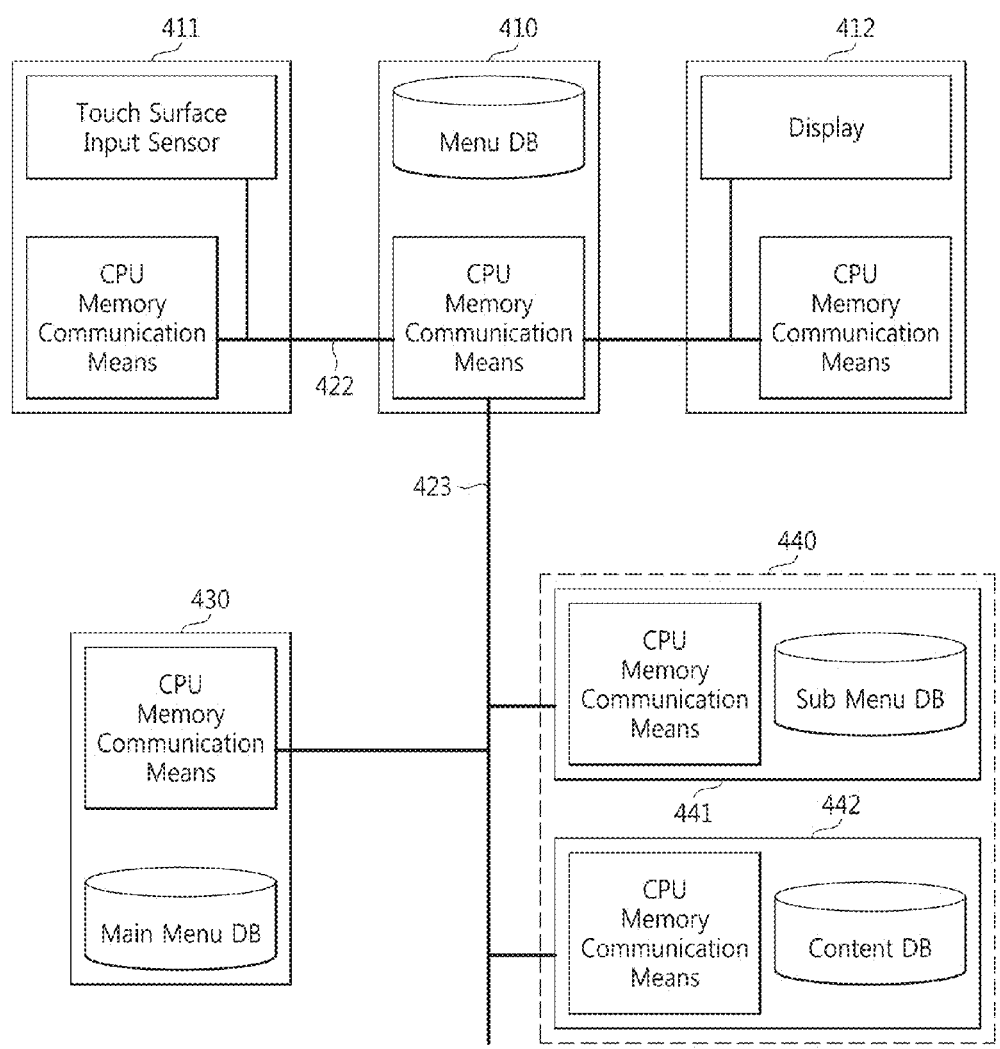
FIG. 6 is a block diagram of a server system according to some embodiments of the present invention.

FIG. 6 is a block diagram of a server system according to some embodiments of the present invention. A server system 430 includes a memory means for storing an application program downloaded to and executed in a client imaging apparatus 410 connected through a wired or wireless communication network and menus structured to respectively correspond to at least two menu search modes and a communication interface means for transmitting the application program and the structured menus. The application program enables a user interface method to function in a computer. The user interface method includes setting at least two menu search modes, setting at least two independent touch regions and at least one dependent touch region, recognizing an initial touch region, selecting a menu search mode corresponding to an initially-touched independent touch region or to the direction of an initial touch movement continuing from the initially-touched independent touch region and making a shift to an item in the selected menu search mode according to information about the touch movement continuing without a touch release, extending the state and method of an ongoing independent touch region menu search mode when receiving touch movement information following an initial touch made on a dependent touch region after a touch release is performed during the independent touch region menu search mode, and executing a menu search mode or command uniquely set for the dependent touch region when receiving touch movement information following an initial touch made on the dependent touch region in a state where there is no independent touch region menu search mode under way. The structured menus are sequentially accessed according to the progress of a menu search mode set by the application program. The server system 430 stores and manages the program enabling the user interface method to function and a menu DB and transmits the program and the menu DB in the form of an app to the client imaging apparatus main body 410 through a wired/wireless communication network 423 such as an internet, so that the user interface method is implemented. At this time, an imaging apparatus may frequently download the menu DB, which is frequently changed like a content menu or EPG data, from the first menu provider server system 430 to update the menu DB stored in the imaging apparatus. Alternatively, the imaging apparatus may download a main menu DB from the first menu provider server system 430 and a sub menu DB from a server system 441 of a second menu provider 440 which provides content through a content server 442 and links an item of the main menu DB stored in the imaging apparatus with the sub menu DB, so that the whole menu DB is updated.

Figure 7:
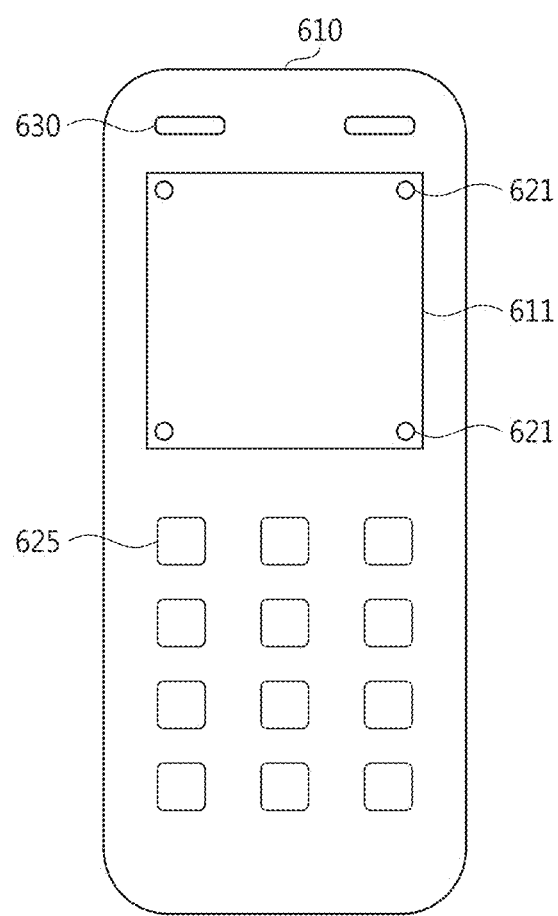
FIG. 7 is a diagram of a remote controller according to some embodiments of the present invention.

FIG. 7 is a diagram of a remote controller 610 according to some embodiments of the present invention. The remote controller 610 includes a flat touch surface input sensor 611 without a means for sensing a touch and a circular touch guide 621 at each of the four corners of the touch surface input sensor 611. A user can easily identify the four edges and central portion of a touch surface as well as the four corners of the touch surface without watching the remote control due to the touch guides at the four corners. Accordingly, even without labels or icons tagged to touch regions, the user can roughly detect each touch region using the touch guides so as to select a predetermined menu search mode or command. When the remote control transmits initial touch position information and touch movement information, the imaging apparatus main body operating in association with the remote controller recognizes an initial touch region from the initial touch position information and selects a menu search mode or command in response to a following touch movement direction. The remote controller in the current embodiments has a central portion set to be wide and corner regions set to be narrow as in the embodiments illustrated in FIG. 1, thereby minimizing an error which may occur when an independent touch region is touched by mistake and allowing most of the touch surface to be used to extend an ongoing independent touch region menu search mode. In an embodiment of recognizing a touch position, a region at which a pointing means such as a thumb contacts a touch surface input sensor such as a capacitive touch pad or touch screen is recognized and the center of the region is detected. The remote controller according to some embodiments of the present invention may include a power button 630 and a number input button 625 apart from the touch surface input sensor.

Terms used herein should not be interpreted as having a meaning only defined in commonly used dictionaries but should be interpreted as embracing the concept and meaning fitting for the objectives of the present invention. It will be understood by those skilled in the art that various changes in form and details may be made in the preferred embodiments without departing from the spirit and scope of the invention as defined by the appended claims. The scope of the invention is defined by the appended claims, and all differences within the scope will be construed as being included in the present invention.

INDUSTRIAL APPLICABILITY

A user is allowed to select one of many search modes and to directly select a final menu item with a single touch movement gesture without watching a remote controller in an imaging apparatus such as a smart TV providing various functions. When a user searches a large-scale menu or selects a menu carefully, a process can divided through multiple touch movements. A dependent touch region set in a wide center area is expansively used as a temporary region for ongoing menu search modes, so that a narrow touch surface of the remote controller can be efficiently used when a large-scale menu is searched and it is possible to immediately return to an initial state of an ongoing menu search mode or to immediately execute another menu search mode or command. Provided is a method which allows touch regions to be set in the main body of the imaging apparatus so that a menu search mode, a touch region, or a command can be variably set according to the function provided by the imaging apparatus and changeable menus or added functions can be easily dealt with, thereby enabling smart imaging apparatuses, which have various and complex functions, to be used with a minimum gesture.

The invention claimed is:

1. A user interface method of an imaging apparatus which includes a communication interface means and which searches various menus by computing touch information received from a remote touch input device, the user interface method comprising:
   setting at least two menu search modes;
   setting at least two independent touch regions and at least one dependent touch region;
   recognizing an initial touch region;
   selecting a menu search mode corresponding to an initially-touched independent touch region or to the direction of an initial touch movement continuing from the initially-touched independent touch region and making a shift to an item in the selected menu search mode according to touch movement information continuing without a touch release;
   extending a state and method of an ongoing independent touch region menu search mode when receiving touch movement information continuing from an initial touch made on a dependent touch region after a touch release is performed in the ongoing independent touch region menu search mode; and
   executing a menu search mode or command uniquely set for the dependent touch region when receiving touch movement information continuing from an initial touch made on the dependent touch region while there is no ongoing independent touch region menu search mode.

2. The user interface method of claim 1, wherein the menu item is a GUI element or a group of GUI elements, which indicate at least one of a command, a TV channel, content, an app, a uniform resource locator (URL), hypertext, hypermedia, and data; and the menu is a group of menu items.

3. The user interface method of claim 1, wherein when the ongoing menu search mode is selected by initially touching the independent touch region again, the user interface method restarts from an initial state of the menu search mode.

4. The user interface method of claim 1, wherein the at least two independent touch regions are set to be separated from each other by the at least one dependent touch region and to be positioned at corners of a virtual touch surface corresponding to a touch surface of a sensor of the touch input device.

5. A non-transitory computer readable recording medium for recording a program enabling the user interface method of claim 1 to function in a computer.

6. A non-transitory computer readable recording medium for recording a program enabling the user interface method of claim 4 to function in a computer.

7. An imaging apparatus which includes a remote touch input device, a CPU, a program, a memory storing the program, and a communication interface means to search and execute a menu according to touch information received from the remote touch input device, the imaging apparatus comprising:
   a means for setting at least two menu search modes;
   a means for setting at least two independent touch regions and at least one dependent touch region;
   a means for recognizing an initial touch region;
   a means for determining a touch movement direction when a touch position moves a predetermined distance or across a predetermined border;
   a means for selecting a menu search mode corresponding to an initially-touched independent touch region or to the direction of an initial touch movement continuing from the initially-touched independent touch region and making a shift to an item in the selected menu search mode according to information about the touch movement continuing without a touch release;
   a means for extending a state and method of an ongoing independent touch region menu search mode when a touch is released during the independent touch region menu search mode and then an initial touch is made on a dependent touch region and moved; and
   a means for executing a menu search mode or command uniquely set for a dependent touch region when an initial touch is made on the dependent touch region and moved in a state where there is no ongoing independent touch region menu search mode.

8. The imaging apparatus of claim 7, wherein when the ongoing menu search mode is selected by initially touching the independent touch region again, the imaging apparatus restarts from an initial state of the menu search mode.

9. The imaging apparatus of claim 7, wherein the at least two independent touch regions are set to be separated from each other by the at least one dependent touch region and to be positioned at corners of a virtual touch surface corresponding to a touch surface input sensor of the touch input device.

* * * * *